(12) United States Patent  (10) Patent No.: US 7,621,242 B2
Kitagawa et al.  (45) Date of Patent: Nov. 24, 2009

(54) VARIABLE VALVE OPERATING MECHANISM

(75) Inventors: Katsutoshi Kitagawa, Seto (JP); Akira Sugiura, Anjo (JP); Tomiyasu Hirano, Gamagouri (JP); Tamotsu Yamamoto, Nishio (JP); Tetsuya Niwa, Kariya (JP)

(73) Assignee: OTICS Corporation, Aichi-ken (JP)

( * ) Notice: Subject to any disclaimer, the term of this patent is extended or adjusted under 35 U.S.C. 154(b) by 351 days.

(21) Appl. No.: 11/637,160

(22) Filed: Dec. 12, 2006

(65) Prior Publication Data

US 2007/0144474 A1 Jun. 28, 2007

(30) Foreign Application Priority Data

Dec. 26, 2005 (JP) ............................. 2005-372039
Feb. 14, 2006 (JP) ............................. 2006-036554

(51) Int. Cl.
 *F01L 1/34* (2006.01)
(52) U.S. Cl. .................. 123/90.16; 123/90.15
(58) Field of Classification Search ............. 123/90.15, 123/90.16, 90.31, 90.27, 90.44
See application file for complete search history.

(56) References Cited

U.S. PATENT DOCUMENTS 5,373,818 A * 12/1994 Unger .................. 123/90.16

6,932,035 B1 8/2005 Shui et al.

FOREIGN PATENT DOCUMENTS

| DE | 43 26 331 A1 | 8/1993 |
|---|---|---|
| DE | 101 23 186 A1 | 5/2001 |
| DE | 103 23 665 A1 | 5/2003 |
| EP | 0 780 547 A1 | 6/1997 |
| EP | 1 096 115 A1 | 5/2001 |
| JP | 10-280931 | 10/1998 |
| JP | 11-324625 | 11/1999 |
| JP | 2004-138000 | 5/2004 |

OTHER PUBLICATIONS

European Search Report dated Apr. 4, 2007.

* cited by examiner

*Primary Examiner*—Zelalem Eshete
(74) *Attorney, Agent, or Firm*—McGinn IP Law Group, PLLC

(57) ABSTRACT

The present invention provides a variable valve operating mechanism which includes two valve operating members for opening and closing two valves individually, a drive cam provided on a single camshaft, two swing arms for transmitting a power of the drive cam to the valve operating members individually by swinging about a different axis to the camshaft, and a variable device for modifying a displacement of the swing arm per rotation of the drive cam in accordance with an operating condition of an internal combustion engine. The variable device includes a single control shaft, an actuator for driving the control shaft, and a cam device that operates in conjunction with the control shaft to dissimilate the displacement of the two swing arms.

10 Claims, 18 Drawing Sheets

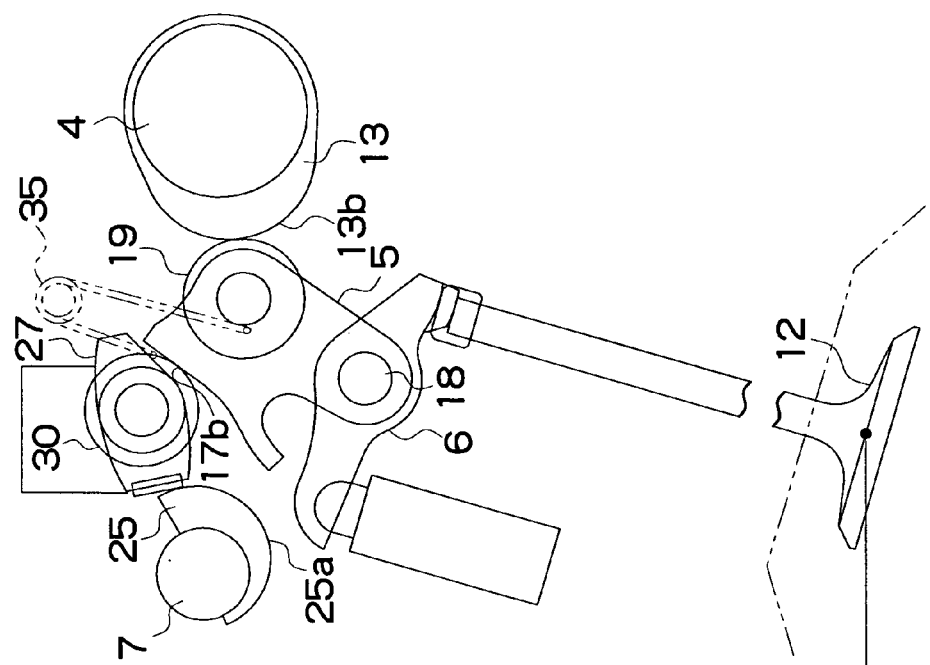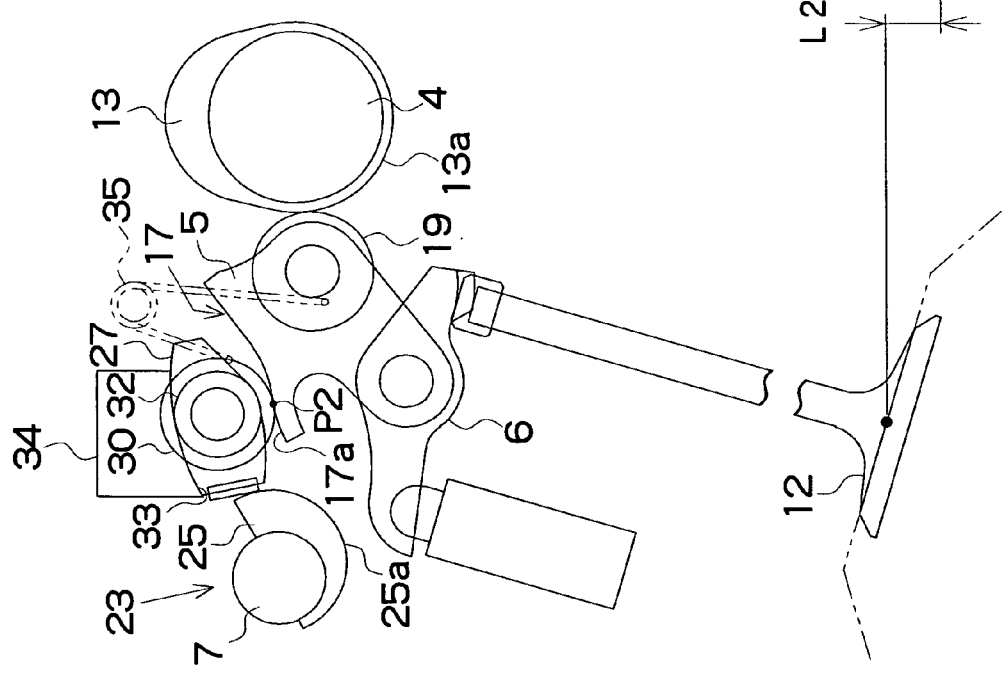

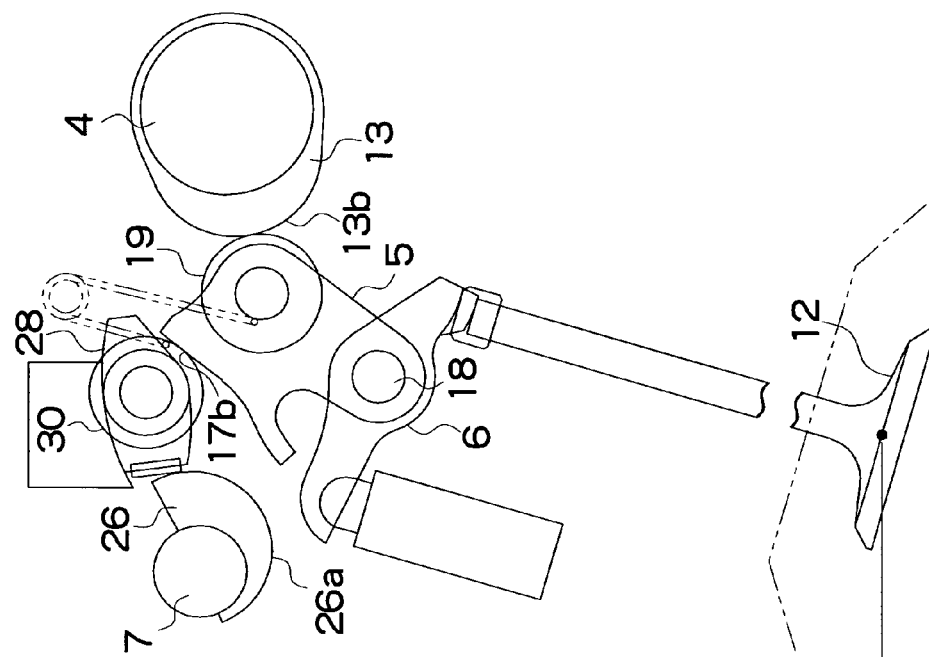
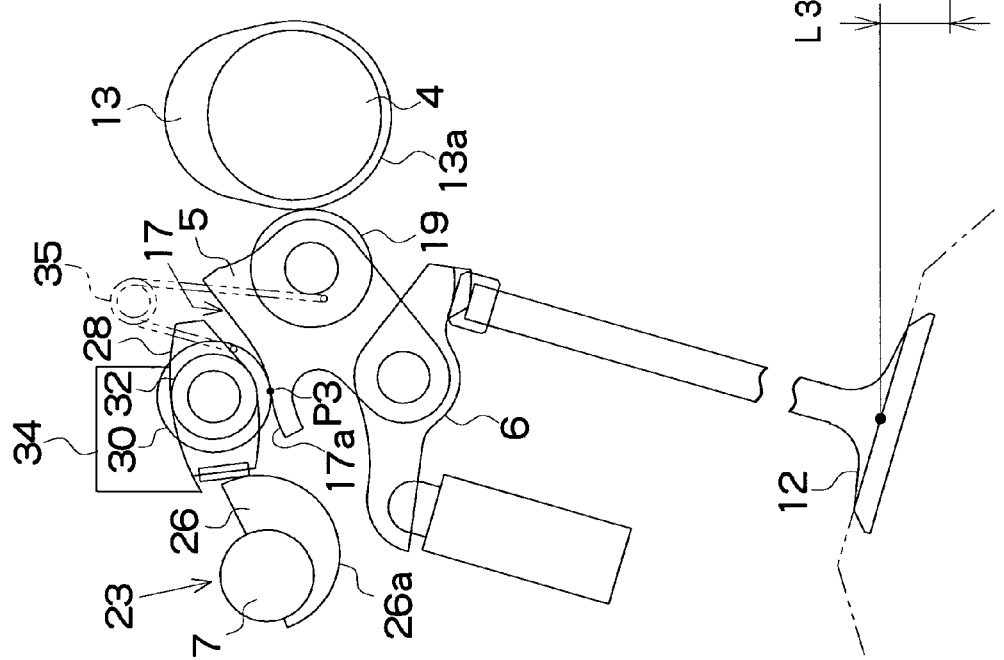

F I G. 7
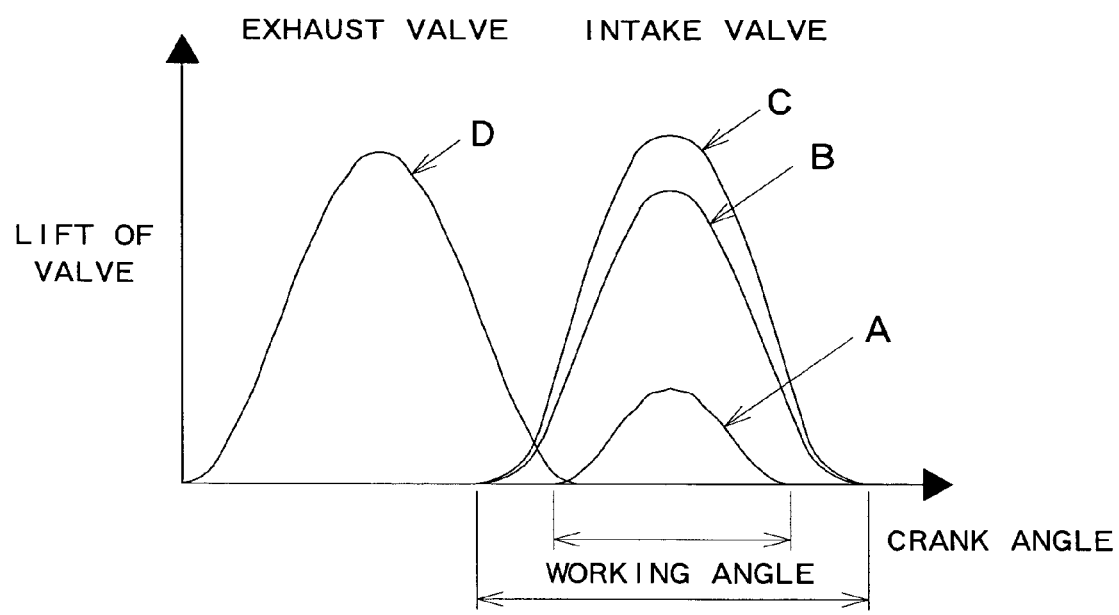

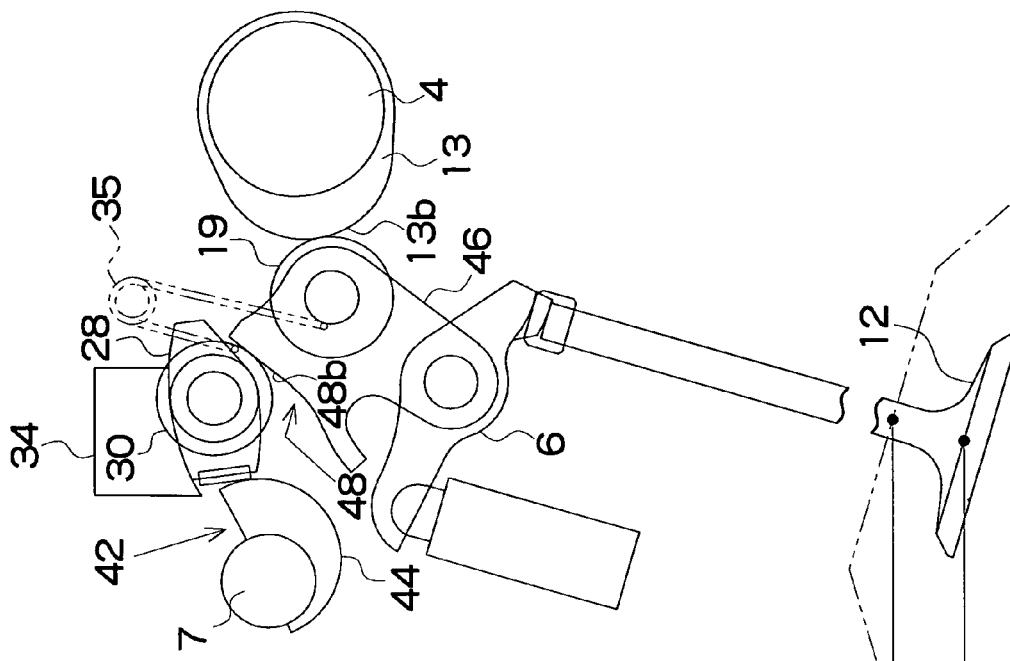
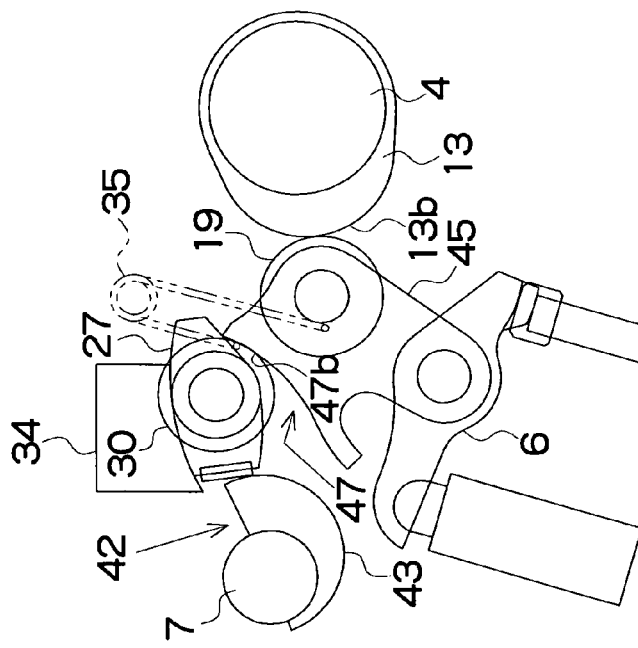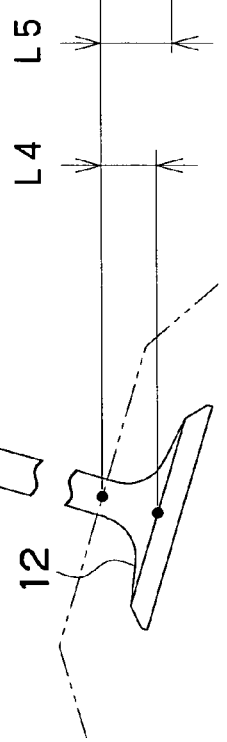

S1: BOTH VALVES HALTED
S2: BOTH VALVES CONTINUOUSLY VARIABLE
S3: BOTH VALVES AT MAXIMUM LIFT
S4: B VALVE AT MAXIMUM LIFT,
    A VALVE CONTINUOUSLY VARIABLE
S5: B VALVE AT MAXIMUM LIFT,
    A VALVE HALTED
S6: A VALVE HALTED
    B VALVE CONTINUOUSLY VARIABLE

S11: BOTH VALVES HALTED
S12: A VALVE HALTED,
     B VALVE CONTINUOUSLY VARIABLE
S13: BOTH VALVES CONTINUOUSLY VARIABLE
S14: A VALVE CONTINUOUSLY VARIABLE,
     B VALVE AT MAXIMUM LIFT
S15: BOTH VALVES AT MAXIMUM LIFT

VARIABLE VALVE OPERATING MECHANISM

TECHNICAL FIELD

The present invention relates to a variable valve operating mechanism for controlling the lift, working angle, and open/close timing of an intake valve or an exhaust valve in accordance with the operating conditions of an internal combustion engine.

BACKGROUND OF THE INVENTION

A variable valve operating mechanism such as that shown in FIG. 18 is described in Japanese Patent Application Publication No. JP-A-11-324625. This variable valve operating mechanism 100 is provided with a valve operating member 102 for opening and closing a valve 101, and a camshaft 103 which is rotated by a crankshaft. A drive cam 104 and a swing cam 106 are provided on the camshaft 103, and a cam surface 105 which engages with the valve operating member 102 is formed on the swing cam 106. An arm 109 is supported on a control shaft 107 via a variable cam 108, and the both ends of the arm 109 are connected to the drive cam 104 and the swing cam 106 by links 110, 111. The displacement of the swing cam 106 is modified in accordance with the operating conditions of an internal combustion engine by varying the angle of the arm 109 using the variable cam 108.

Japanese Patent Publication No. 3485434 describes a variable valve operating mechanism for an internal combustion engine having two intake valves and two exhaust valves per cylinder, in which two drive cams 104 and two swing cams 106 are provided on a camshaft 103, similarly to JP-A-11-324625. By dissimilating the profiles of the two drive cams 104 or dissimilating the profiles (the shapes of cam surfaces 105) of the two swing cams 106, a difference in lift can be applied to the two valves 101, so that a swirl is generated in the cylinder, and thus the fuel consumption is improved.

Japanese Patent Application Publication No. JP-A-2004-138000 describes a variable valve operating mechanism in which two drive cams are provided on a camshaft for each cylinder, a control shaft and a gear mechanism are incorporated into the camshaft for varying the relative phase of the drive cams, two swing arms are provided on a support shaft for each cylinder, two control shafts and a gear mechanism are incorporated into the support shaft for varying the relative phase of the swing arms, and the three control shafts are controlled individually by actuators, so that a difference in lift is applied to the two valves in each cylinder.

However, according to the variable valve operating mechanisms of Japanese Patent Application Publication No. JP-A-11-324625 and Japanese Patent Publication No. 3485434, the drive cam 104 and swing cam 106 are both provided on the control shaft 103, and hence a power transmission path extending from the drive cam 104 to the valve operating member 102 is complicated. Further, the power transmission path is closed by the links 110, 111, and therefore a large load acts on the control shaft 107 as the drive cam 104 rotates. Accordingly, a large hydraulic or electric device must be used as the actuator for driving the control shaft 107, and the high output of this large actuator leads to an increase in power loss in the internal combustion engine. As a result, the valuable swirl effect attenuates, leading to deterioration of the fuel consumption.

According to the variable valve operating mechanism of JP-A-2004-138000, a difference in lift is applied to the two valves by varying the relative phase of the two drive cams and the relative phase of the two swing arms. Therefore, a control shaft and a gear mechanism must be incorporated into both the camshaft and the support shaft, and individual actuators are required for the three control shafts. As a result, the overall number of components in a variable device increases, and complications arise in both structure and control.

SUMMARY OF THE INVENTION

An object of the present invention is to solve the problems described above and to provide a variable valve operating mechanism having a comparatively simple structure, which is capable of variably controlling the characteristics of two valves independently, requires only a small actuator, and can realize an improvement in the fuel consumption of an internal combustion engine without damaging a swirl effect.

In order to solve the aforementioned problems, the variable valve operating mechanism of this invention includes two valve operating members for opening and closing two valves individually, a drive cam provided on a single camshaft, two swing arms for transmitting a power of the drive cam to the valve operating members individually by swinging about a different axis to the camshaft, and a variable device for modifying a displacement of the swing arms per rotation of the drive cam in accordance with an operating condition of an internal combustion engine. The variable device includes a single control shaft, an actuator for driving the control shaft, and a cam device that operates in conjunction with the control shaft to dissimilate the displacement of the two swing arms.

The following constitutions may be employed in relation to a swing arm.
(1) The swing arm is disposed in a region surrounded by a camshaft, a valve operating member, and a variable device.
(2) The swing arm is provided with an input portion which engages with a drive cam, an output portion which engages with the valve operating member, and a cam surface which contacts a contact of the variable device.
(3) The swing arm is disposed above a cylinder head, the output portion is provided so as to face downward, and the cam surface is provided so as to face upward.
(4) The output portion of the swing arm is connected rotatably to the valve operating member.

The following constitutions may be employed in relation to the valve operating member.
(5) A rocker arm which swings about a base end is used as the valve operating member.
(6) A swing arm which swings about an intermediate portion is used as the valve operating member.
(7) A cup-shaped lifter capable of linear movement in the axial direction of the valve is used as the valve operating member.

The following constitutions may be employed in relation to the variable device.
(8) The variable device is constituted by a contact which contacts the cam surface of the swing arm, a variable member which varies the contact position between the contact and the cam surface, an actuator which drives the variable member, and a guide member which guides the contact between itself and the cam surface.
(9) The variable member includes a cam disposed on a control shaft.
(10) The variable member includes an arm disposed on the control shaft and a link for supporting the contact.
(11) The guide member is fixed to a housing of the variable valve operating mechanism in a position above the cam surface of the swing arm, and a downward-facing guide surface which opposes the cam surface is formed on the guide member.

The following constitutions may be employed in relation to a cam device for dissimilating the displacements of the swing arms.

(12) The cam device includes two variable cams for driving the two swing arms individually, and the two variable cams are provided on the control shaft and are provided with cam surfaces having respectively different profiles.

(13) Each cam surface of the two variable cams includes a maximum lift portion in an identical rotation section of the control shaft, and the both maximum lift portions are formed at equal heights from an axial center of the control shaft.

(14) The cam surfaces of the two variable cams are formed at different heights from the axial center of the control shaft in a different rotation section of the control shaft to the rotation section of the maximum lift portions.

(15) In an identical first rotation section (S3) of the control shaft, each cam surface of the two variable cams comprises the maximum lift portion at which the respective valves reach a maximum lift, and in an identical second rotation section (S4) of the control shaft, which is adjacent to the first rotation section, the cam surface of one of the variable cams comprises continuous maximum lift portions for maintaining the maximum lift of the valve, and the cam surface of the other variable cam comprises a gradually decreasing lift portion for continuously decreasing the lift of the valve.

(16) In an identical third rotation section (S5) of the control shaft, which is adjacent to the second rotation section, the cam surface of one of the variable cams comprises continuous maximum lift portions for maintaining the maximum lift of the valve, and the cam surface of the other variable cam comprises a minimum lift portion for halting the valve.

(17) In an identical fourth rotation section (S6) of the control shaft, which is adjacent to the third rotation section, the cam surface of one of the variable cams comprises a gradually decreasing lift portion for continuously decreasing the lift of the valve, and the cam surface of the other variable cam comprises continuous minimum lift portions for halting the valve.

(18) The cam device includes cam surfaces formed on two swing arms, and the cam surfaces are formed with different profiles to each other.

According to the variable valve operating mechanism of the present invention, the swing arm is provided on a different axis to the camshaft such that a power transmission path extending from the drive cam to the valve operating member is open. Thus, the load acting on the control shaft from the camshaft side can be reduced, and the actuator of the variable device can be reduced in size. The control shaft is driven by the small actuator, and a difference in lift is applied to the two valves by the cam device, which operates in conjunction with the control shaft. Thus, a swirl is generated efficiently in the cylinder, thereby enabling an improvement in the fuel consumption of the internal combustion engine.

Further, when the cam device is constituted by two variable cams disposed on the control shaft, the lifts of the two valves can be dissimilated easily by varying the profiles of the two variable cams. Moreover, by varying the profiles in various combinations, an optimum swirl can be generated in the cylinder, thereby enabling a further improvement in fuel consumption.

Particularly when the maximum lift portions of the two variable cams are aligned at equal heights in the same rotation section of the control shaft and the two valves are driven at the maximum lift, the two variable cams receive a uniform force from the drive cam, and as a result, rotary torque acting on the control shaft from the camshaft side can be reduced to zero. Hence, even when a small actuator is used, the control shaft can be held securely in a maximum power generating position, and thus irregularities in the working angle of the two valves can be reduced, and vibration in the internal combustion engine can be suppressed.

BRIEF DESCRIPTION OF THE DRAWINGS

FIGS. 5A and 5B are structural diagrams showing an action produced in the variable valve operating mechanism when the displacement of one of the swing arms is maximized;

FIGS. 6A and 6B are structural diagrams showing an action produced in the variable valve operating mechanism when the displacement of the other swing arm is maximized;

FIG. 7 is a characteristic diagram showing the relationship between a lift and a working angle of a valve in the variable valve operating mechanism;

FIGS. 9A and 9B are structural diagrams showing an action produced in the variable valve operating mechanism thereof when the displacements of two swing arms are maximized;

DETAILED DESCRIPTION OF THE INVENTION

Figure 1:
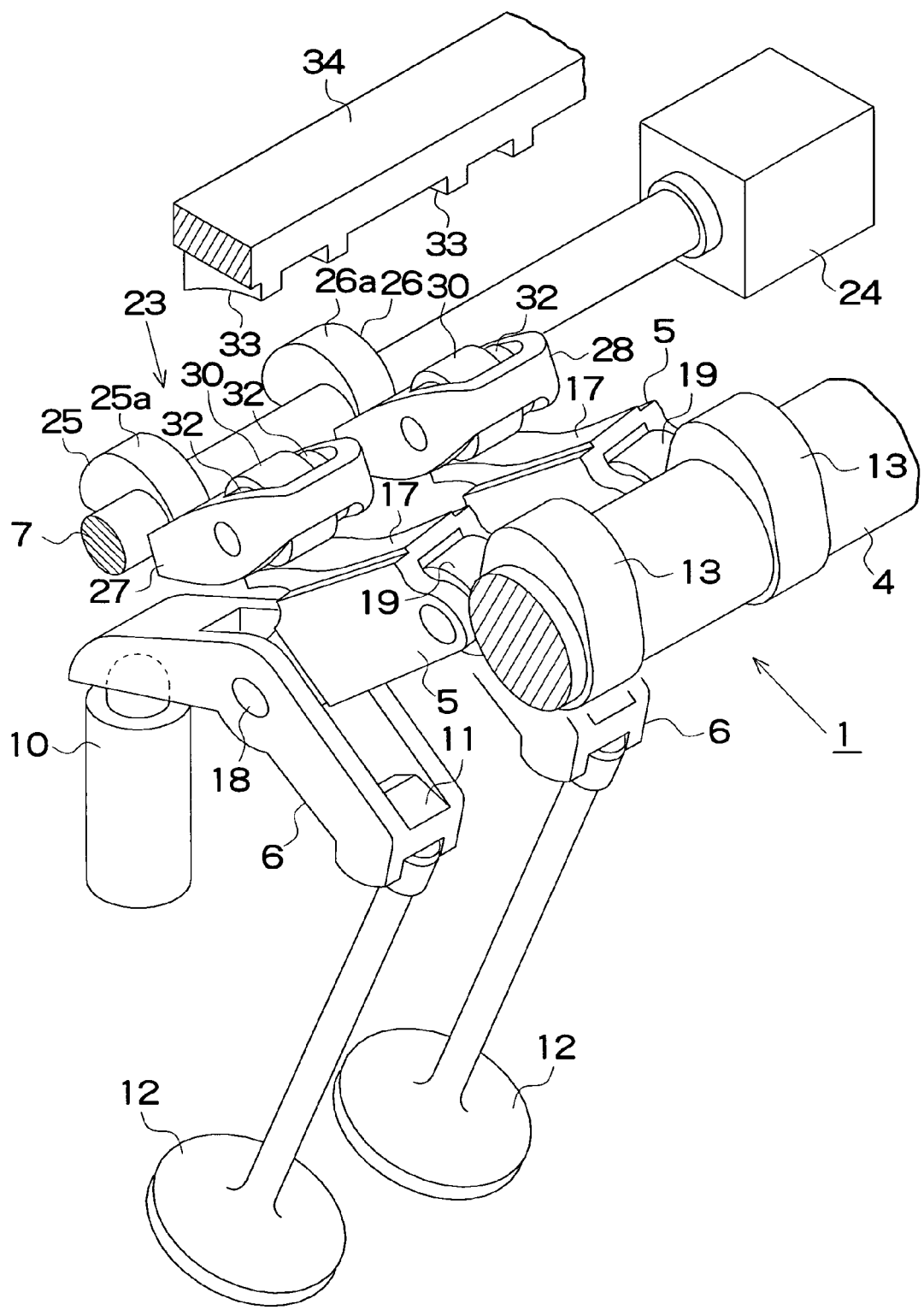
FIG. 1 is a perspective view of a variable valve operating mechanism according to a first example of the present invention.

Examples of the present invention will be described below on the basis of the drawings. As shown in FIG. 1, a variable valve operating mechanism 1 according to this example is provided in a gasoline engine having two intake valves 12 and two exhaust valves per cylinder, and comprises a single camshaft 4, two drive cams 13 provided on the camshaft 4, two rocker arms 6 which open and close the intake valves 12 individually, two swing arms 5 which swing about a different axis to the camshaft 4 so that the power of the drive cams 13 is transmitted individually to the two rocker arms 6, and a variable device 23 which modifies the displacement of the swing arms 5 per rotation of the drive cams 13 in accordance with the operating conditions of the gasoline engine.

The variable device 23 is constituted by an actuator 24, a control shaft 7 which is driven by the actuator 24, two variable cams 25, 26 provided on the control shaft 7, and two variable arms 27, 28 for transmitting the power of the variable cams 25, 26 to the swing arms 5. The two variable cams 25, 26 are provided with cam surfaces 25a, 26a having different profiles to each other, and thus constitute a cam device for dissimilating the displacements of the two swing arms 5. In a variable valve operating mechanism 41 shown in FIG. 8, the cam surfaces 47, 48 of two swing arms 45, 46 are formed with different profiles to each other, and thus a variable device 42 dissimilates the displacement of two swing arms 5.

EXAMPLE 1

FIGS. 1 to 7 show a variable valve operating mechanism according to a first example. The variable valve operating mechanism 1 is installed in a gasoline engine for a multi-cylinder automobile. In the gasoline engine, two intake valves 12 and two exhaust valves (not shown) are provided for each cylinder. Hereafter, the structure and actions of the variable valve operating mechanism 1 for the intake valves 12 will be described, but similar actions may be obtained when an identical structure is employed as a variable valve operating mechanism for the exhaust valves.

Figure 2:
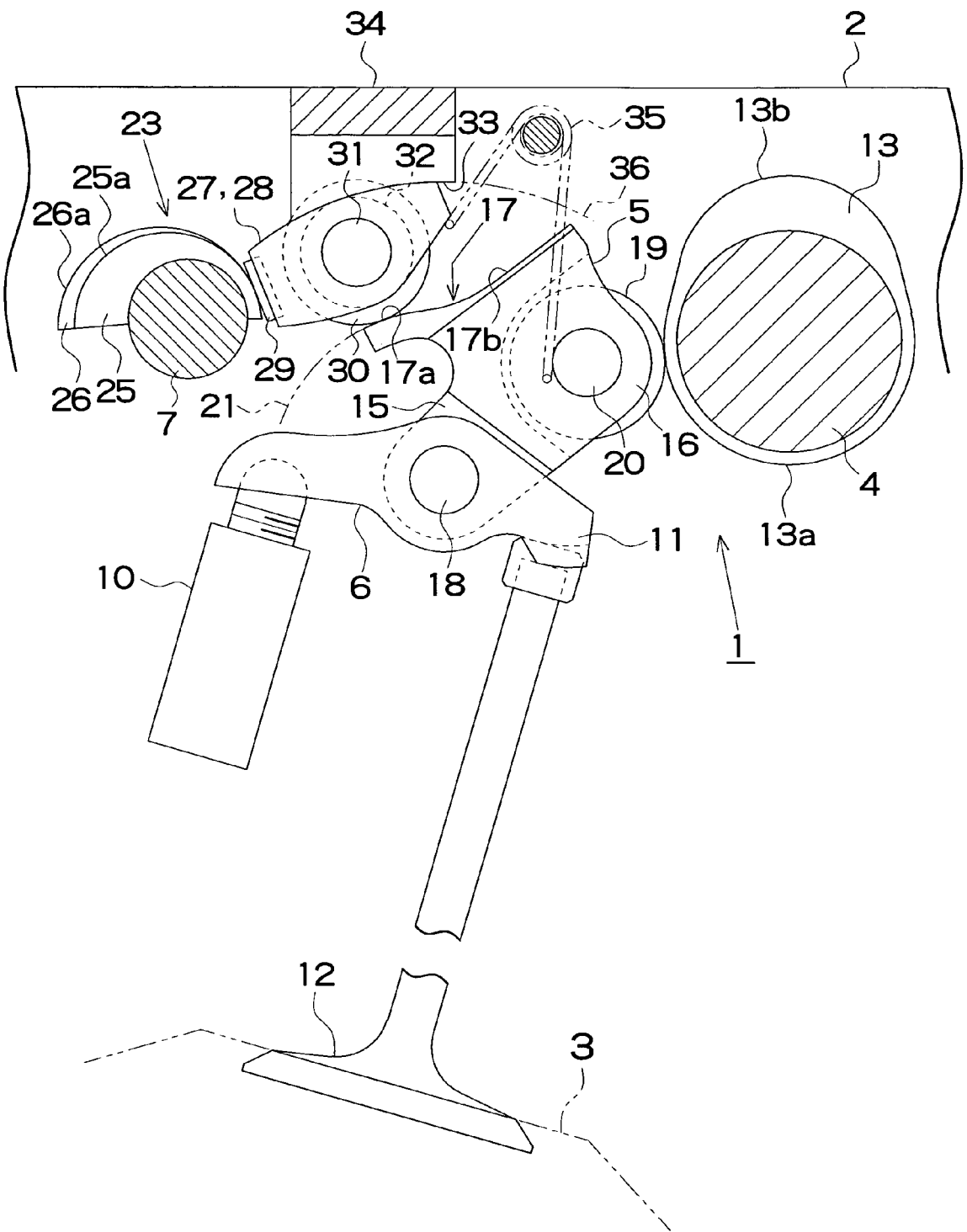
FIG. 2 is a sectional view of the variable valve operating mechanism seen from the left of FIG. 1.
Figure 3:
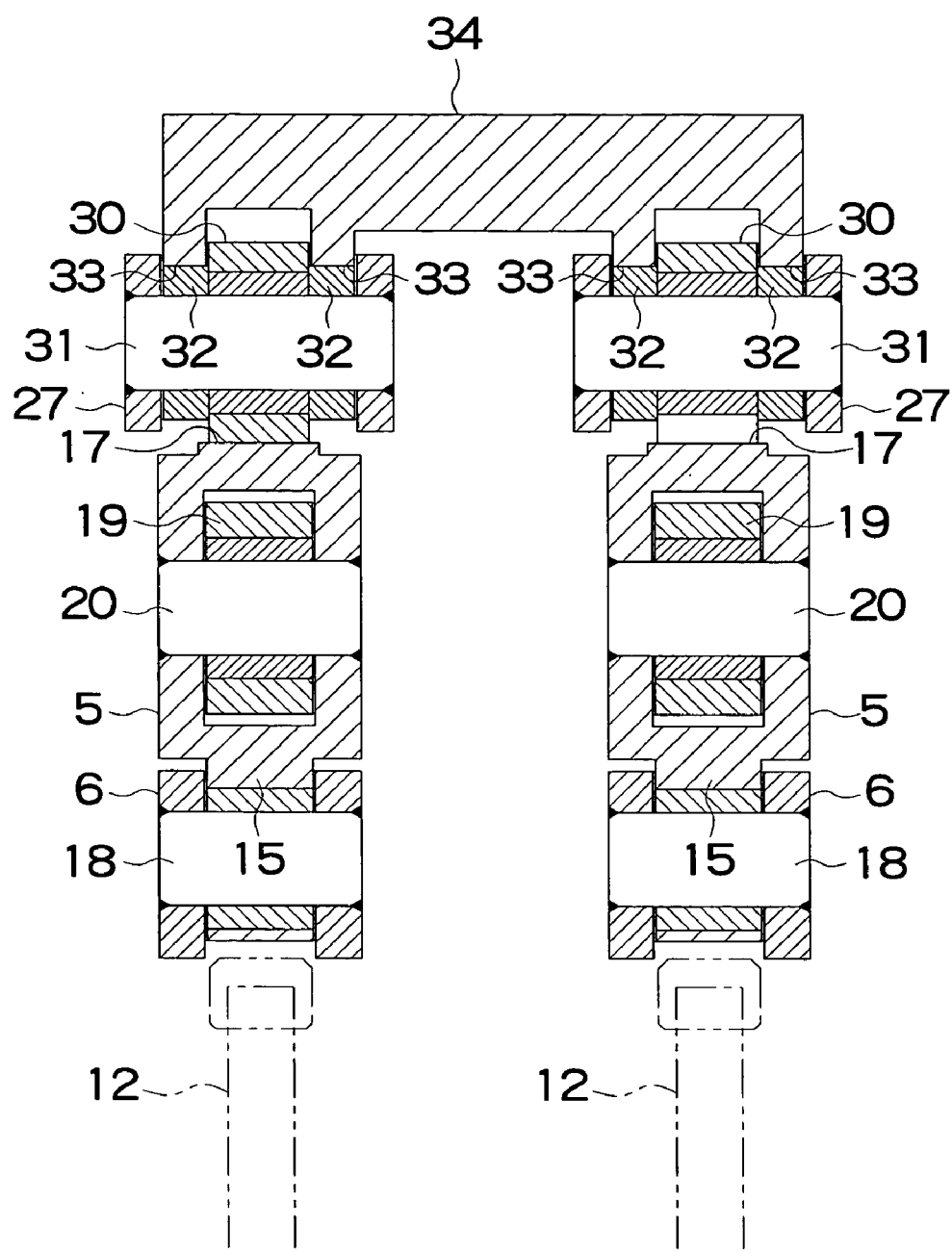
FIG. 3 is a longitudinal sectional view showing a structure in the variable valve operating mechanism combining a swing arm, a rocker arm, a displacement arm, and a guide member.

As shown in FIGS. 1 to 3, a housing 2 of the variable valve operating mechanism 1 is disposed on a cylinder head 3, and one camshaft 4, two swing arms 5, two rocker arms 6, and one control shaft 7 are disposed in the housing 2. The camshaft 4 and the control shaft 7 are supported parallel to one another in a high location removed from the top of the cylinder head 3, while the rocker arms 6 are provided in low locations near the cylinder head 3. The swing arms 5 are disposed in a region surrounded by the camshaft 4, control shaft 7, and rocker arms 6.

Each rocker arm 6 is supported by a pivot 10 at the base end thereof, and has a pressing portion 11 at the tip end thereof. The rocker arm 6 swings up and down about the pivot 10 so as to open and close the valve (intake valve) 12 by the pressing portion 11. Two drive cams 13 per cylinder are fixed to the camshaft 4 and are rotated integrally with the camshaft 4 by a crankshaft (not shown) of the engine. The drive cams 13 are each provided with a base portion 13a for maintaining the lift of the valve 12 at zero within a predetermined angular range, and a nose portion 13b for increasing the valve lift within the remaining angular range.

The swing arms 5 are each provided with a downward-facing output portion 15, a lateral-facing input portion 16, and an upward-facing cam surface 17. The output portion 15 is connected rotatably to an intermediate portion of the rocker arm 6 by a connecting shaft 18. A roller 19 which engages with the drive cam 13 is supported on the input portion 16 by a roller shaft 20. The cam surface 17 is formed with a portion 17a having a constant radius of curvature, which is included in a cylindrical surface 21 centering on the axis of the connecting shaft 18, and a lift portion 17b which stands diagonally upright toward the outside of the cylindrical surface 21. The swing arm 5 swings about the connecting shaft 18 in accordance with the profile of the drive cam 13 so that the power of the drive cam 13 is transmitted to the rocker arm 6.

On the periphery of the control shaft 7, there is provided a variable device 23 for modifying the displacement of the swing arm 5 per rotation of the drive cam 13 in accordance with the operating conditions of the engine. The variable device 23 is constituted by a hydraulic or electric actuator 24 which rotates the control shaft 7, two variable cams 25, 26 fixed to the control shaft 7, and two variable arms 27, 28 which transmit the power of the variable cams 25, 26 to the swing arms 5 individually. The actuator 24 is controlled by a control device (not shown) in accordance with the engine operating conditions, and drives the variable arms 27, 28 via the control shaft 7 and the variable cams 25, 26.

A shim 29 which contacts the variable cam 25, 26 is provided on one end surface of each variable arm 27, 28, and a contact 30 which contacts the cam surface 17 of the swing arm 5 is supported rotatably on the inside of each variable arm 27, 28. The variable cams 25, 26 respectively include cam surfaces 25a, 26a having different profiles, and a maximum diameter portion of one cam surface 26a is set to be higher than that of the other cam surface 25a. The variable cams 25, 26 shift the variable arms 27, 28 by different displacements, respectively, and dissimilate the displacements of the two swing arms 5 by varying the initial contact position between the contact 30 and the cam surface 17.

A pair of rings 32 (see FIG. 3) is provided to the two sides of each contact 30 on the inside of the variable arms 27, 28 and on a spindle 31 of the contact 30. In an upper portion of the housing 2, there are provided a guide member 34 including downward-facing guide surfaces 33 which engage with the rings 32, and a spring 35 for each valve 12. The spring 35 urges the variable arm 27, 28 to the side of the variable cam 25, 26 and the guide member 34. The guide surface 33 is formed along a curved surface 36 (see FIG. 2) that is concentric with the cylindrical surface 21 such that when the initial contact point between the contact 30 and the cam surface 17 is varied, the contact 30 of the variable arm 27, 28 is guided between the guide surface 33 and the cam surface 17 of the swing arm 5.

Figure 4A:
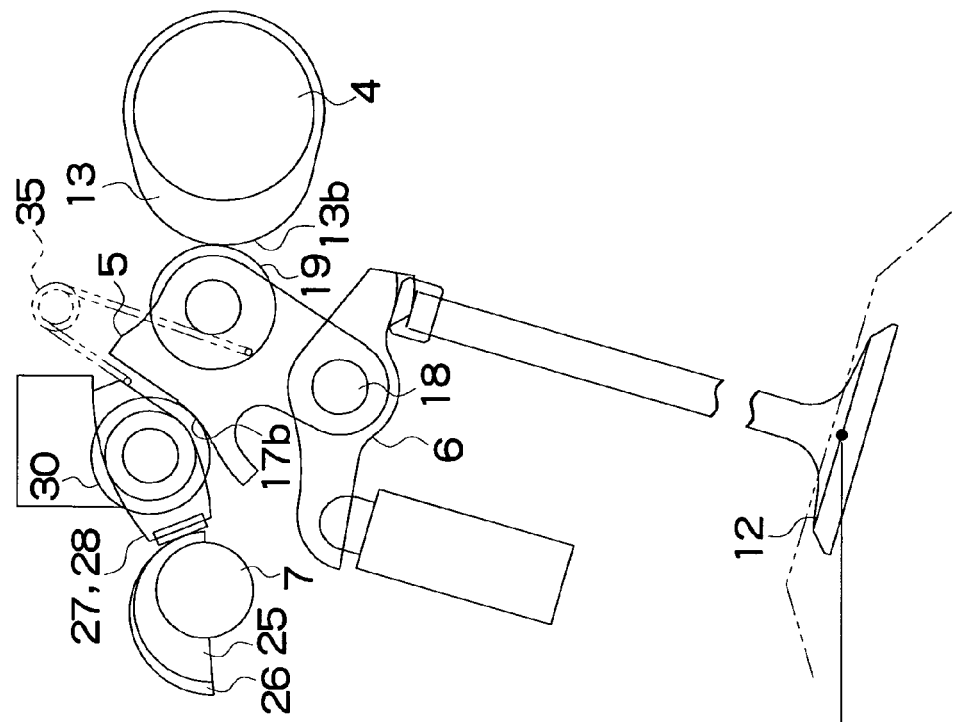
FIGS. 4A and 4B are structural diagrams showing an action produced in the variable valve operating mechanism when the displacements of two swing arms are minimized.
Figure 4B:
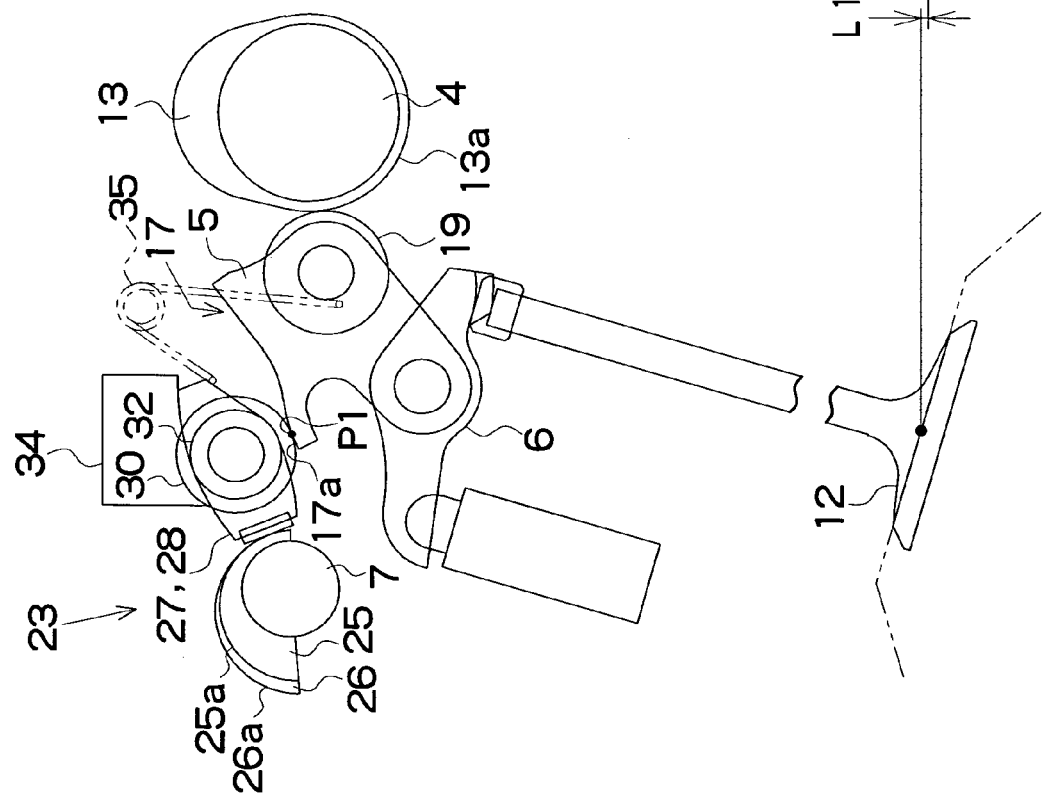

Next, the actions of the variable valve operating mechanism 1 will be described with reference to FIGS. 4A to 7. FIGS. 4A and 4B show an action occurring when the two swing arms 5 (which overlap in the drawing) are operated at a minimum displacement. At this time, minimum diameter portions of the two variable cams 25, 26 of the variable device 23 are engaged respectively with the variable arms 27, 28. Thus, the variable arms 27, 28 are shifted to the control shaft 7 side by the urging force of the spring 35, and the contacts 30 contact a starting end side of the constant-radius-of-curvature portions 17a on the cam surfaces 17 of the swing arms 5 (reference numeral P1 denotes the initial contact position). As shown in FIG. 4A, when the drive cams 13 rotate in this state, the swing arms 5 do not swing while a base portions 13a are engaged with the rollers 19, and as a result, the rocker arms 6 remain stationary and the valves 12 are held in a closed position.

As shown in FIG. 4B, when the apex of the nose portions 13b engage with the rollers 19, the contacts 30 contact the lift portions 17b of the cam surfaces 17, so that the swing arms 5 are displaced along the gradient of the lift portions 17b by downward force. However, the initial contact point P1 is set at the starting end side of the constant-radius-of-curvature portion 17a, and therefore the range of contact between the lift portion 17b and the contact 30 is limited. Thus the swing arms 5 are displaced only slightly and the two rocker arms 6 swing at a minimum angle. Hence, as shown by a curve A in FIG. 7, both the lift and the working angle of the two intake valves 12 are minimized, and as a result, the opening timing is controlled to a late timing and the closing timing is controlled to an early timing. Note that L1 in FIGS. 4A and 4B denotes the minimum lift of the intake valve 12, and a curve D in FIG. 7 denotes the lift and working angle of the exhaust valve.

FIGS. 5A and 5B show an action occurring when one of the swing arms 5 (the swing arm 5 shown on the left side of FIG. 1) is operated at a maximum displacement. At this time, a maximum diameter portion of the variable cam 25 is engaged with the variable arm 27, so that the variable arm 27 is shifted to the camshaft 4 side against the urging force of the spring 35 and an initial contact position P2 between the contact 30 and the cam surface 17 shifts to a terminal end side of the constant-radius-of-curvature portion 17a. When the initial contact position changes, the contact 30 is guided between the concentric guide surface 33 and the constant-radius-of-curvature portion 17a, and thus the swing arm 5 is not pushed downward by the power of the variable cam 25 and the initial phase of the rocker arm 6 does not change.

Hence, as shown in FIG. 5A, while the base portion 13a is engaged with the roller 19, the swing arm 5 and rocker arm 6 are both stationary, and the valve 12 is held in the closed position. On the other hand, as shown in FIG. 5B, when the apex of the nose portion 13b engages with the roller 19, the contact 30 rises to the terminal end side of the lift portion 17b, so that the swing arm 5 is displaced greatly downward along the sharp gradient of the lift portion 17b and one of the rocker arms 6 swings at the maximum angle. Accordingly, as shown by a curve B in FIG. 7, the lift and working angle of one of the valves 12 are both maximized, so that the opening timing is controlled to an early timing and the closing timing is controlled to a late timing. Note that reference numeral L2 in FIGS. 5A and 5B denotes the maximum lift of one of the valves 12.

FIGS. 6A and 6B show an action occurring when the other swing arm 5 (the swing arm 5 shown on the right side of FIG. 1) is operated at the maximum displacement. At this time, the maximum diameter portion of the variable cam 26 is engaged with the variable arm 28, similarly to the variable cam 25, so that the variable arm 28 is shifted to the camshaft 4 side and an initial contact position P3 between the contact 30 and the cam surface 17 shifts to the terminal end side of the constant-radius-of-curvature portion 17a. However, the maximum diameter portion of the variable cam 26 is set higher than that of the variable cam 25, and therefore the initial contact position P3 between the contact 30 and the cam surface 17 shifts further toward the terminal end side of the constant-radius-of-curvature portion 17a than the initial contact position P2 shown in FIG. 5A.

Hence, as shown in FIG. 6B, when the apex of the nose portion 13b engages with the roller 19, the contact 30 rises to the terminal end of the lift portion 17b, so that the swing arm 5 displaces even more greatly downward by a distance corresponding to the effective length of the lift portion 17b, and the other rocker arm 6 displaces further downward than the first rocker arm 6. Accordingly, a lift L3 of the other valve 12 increases beyond that of the first valve 12 (L3>L2), the valve characteristic shown by a curve C in FIG. 7 is obtained, and as a result of the difference between the two valve characteristics, a swirl is generated in the cylinder, thereby improving the fuel consumption of the engine.

According to the variable device 23 of this example, the contact 30 is guided between the cam surface 17 of the swing arm 5 and the guide surface 33 of the guide member 34, and therefore the power of the drive cam 13 is distributed to the guide member 34 side and the variable cam 25, 26 side with the contact 30 serving as a bifurcation point. As a result, the load acting on the variable cams 25, 26 is reduced by half, and the drive torque of the control shaft 7 decreases. Accordingly, a small, low output hydraulic or electric device may be used as the actuator 24, engine power loss can be suppressed, and an improvement in fuel consumption can be realized without damaging the swirl effect. Moreover, the cam surface 17 of the swing arm 5 is provided in an upward-facing manner, and therefore the rocker arm 6 can be connected integrally to the lower side of the swing arm 5 and the two components can be disposed above the cylinder head 3 in a compact manner. Furthermore, the cam-following capability of the rocker arm 6 in a high rotation speed region can be improved.

EXAMPLE 2

Figure 8:
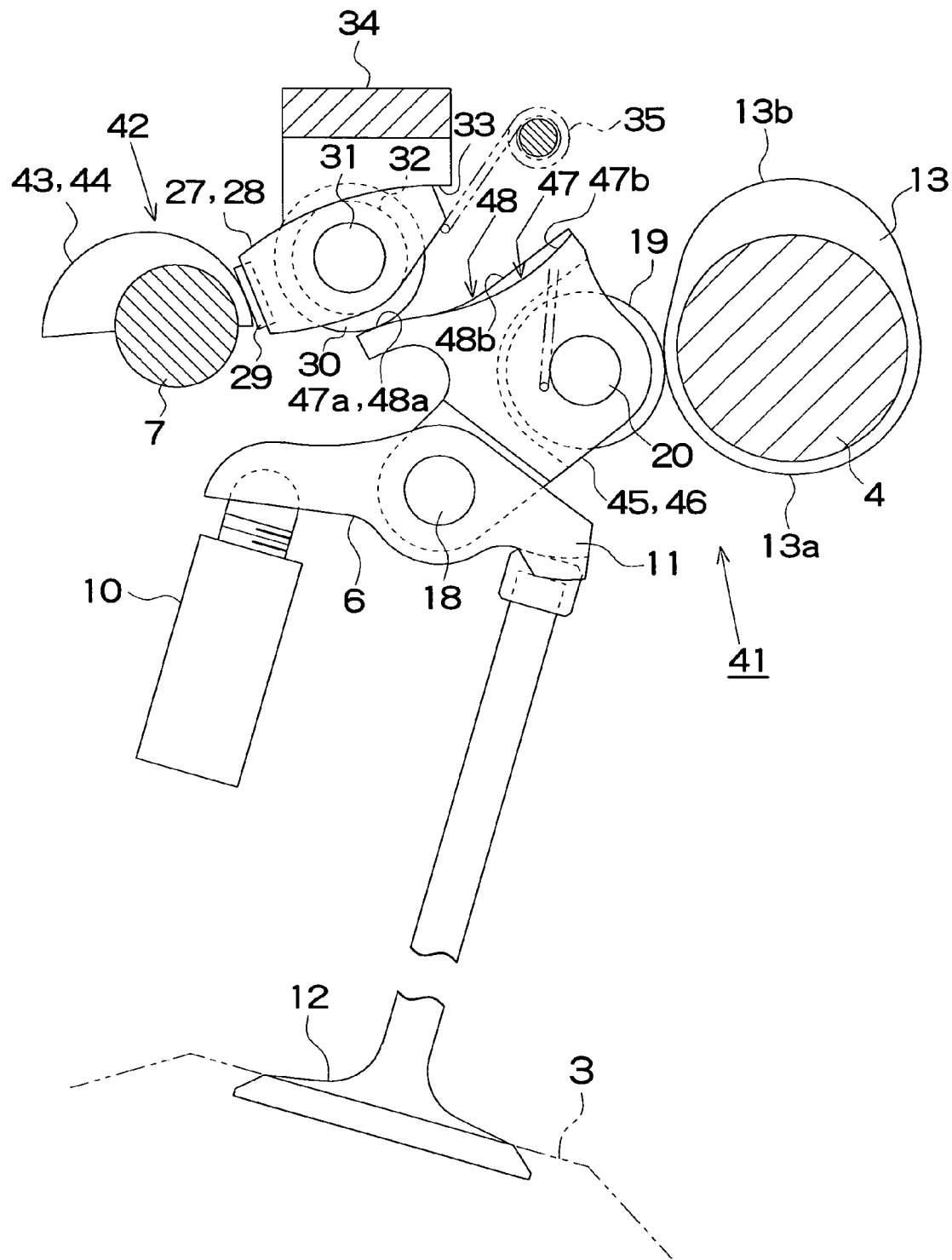
FIG. 8 is a sectional view of a variable valve operating mechanism according to a second example of the present invention.

FIGS. 8, 9A, and 9B show a variable valve operating mechanism according to a second example. As shown in FIG. 8, in this variable valve operating mechanism 41, a variable device 42 includes two variable cams 43, 44 (overlapping in the drawing) having identical profiles. However, two swing arms 45, 46 comprise cam surfaces 47, 48 having different profiles. The cam surface 47 of one of the swing arms 45 is formed with a lift portion 47b having a concave curved surface. The cam surface 48 of the other swing arm 46 is formed with a lift portion 48b having a planar surface (i.e. the same shape as the lift portion 17b of the first example). Constant-radius-of-curvature portions 47a, 48a of the cam surfaces 47, 48 are similar to those of the first example, and all other constitutions are identical to the first example.

FIGS. 9A and 9B show a state occurring when the two swing arms 45, 46 are operated at the maximum displacement. At this time, as shown in FIG. 9A, the maximum diameter portion of the variable cam 43 engages with the variable arm 27 on the side of the swing arm 45, whereby the nose portion 13b of the drive cam 13 engages with the roller 19 and the contact 30 engages with the concave curved surface lift portion 47b on the cam surface 47 of the swing arm 45. The swing arm 45 is displaced greatly downward, and as a result, one of the rocker arms 6 swings at the maximum angle and a lift L4 of one of the valves 12 is maximized.

As shown in FIG. 9B, on the side of the other swing arm 46, the maximum diameter portion of the variable cam 44 engages with the variable arm 28, so that the contact 30 engages with the planar lift portion 48b on the cam surface 48 of the swing arm 46. The lift portion 48b is positioned higher than the concave curved surface lift portion 47b, and therefore the swing arm 46 is displaced further downward than the swing arm 45, so that the other rocker arm 6 swings at the maximum angle and a maximum lift L5 of the other valve 12 exceeds that of the first valve (L5>L4). Hence, similar actions and effects to those of the first example are obtained by dissimilating the cam profiles of the two swing arms 45, 46.

EXAMPLE 3

Figure 10:
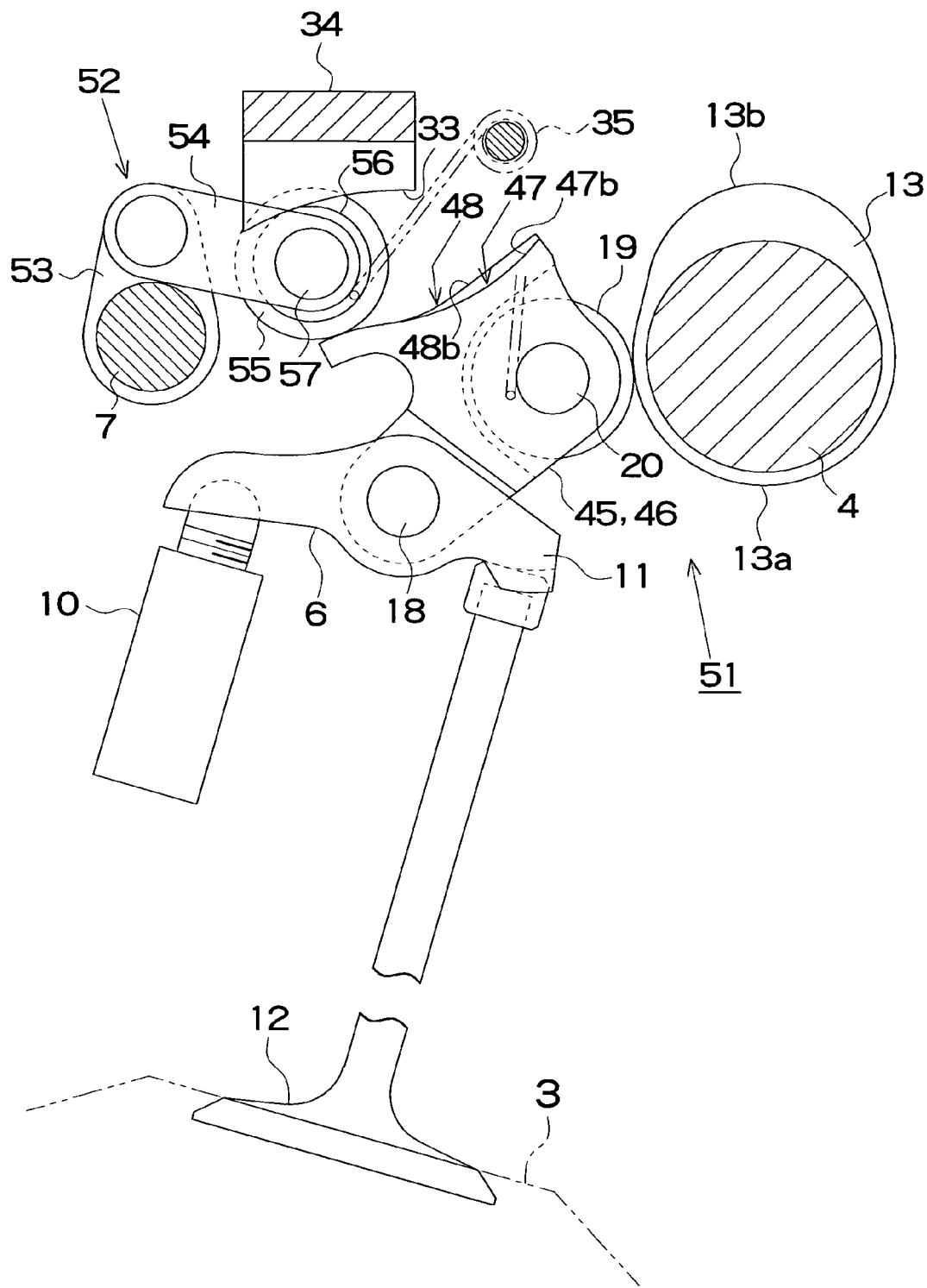
FIG. 10 is a sectional view of a variable valve operating mechanism according to a third example of the present invention.
Figure 11:
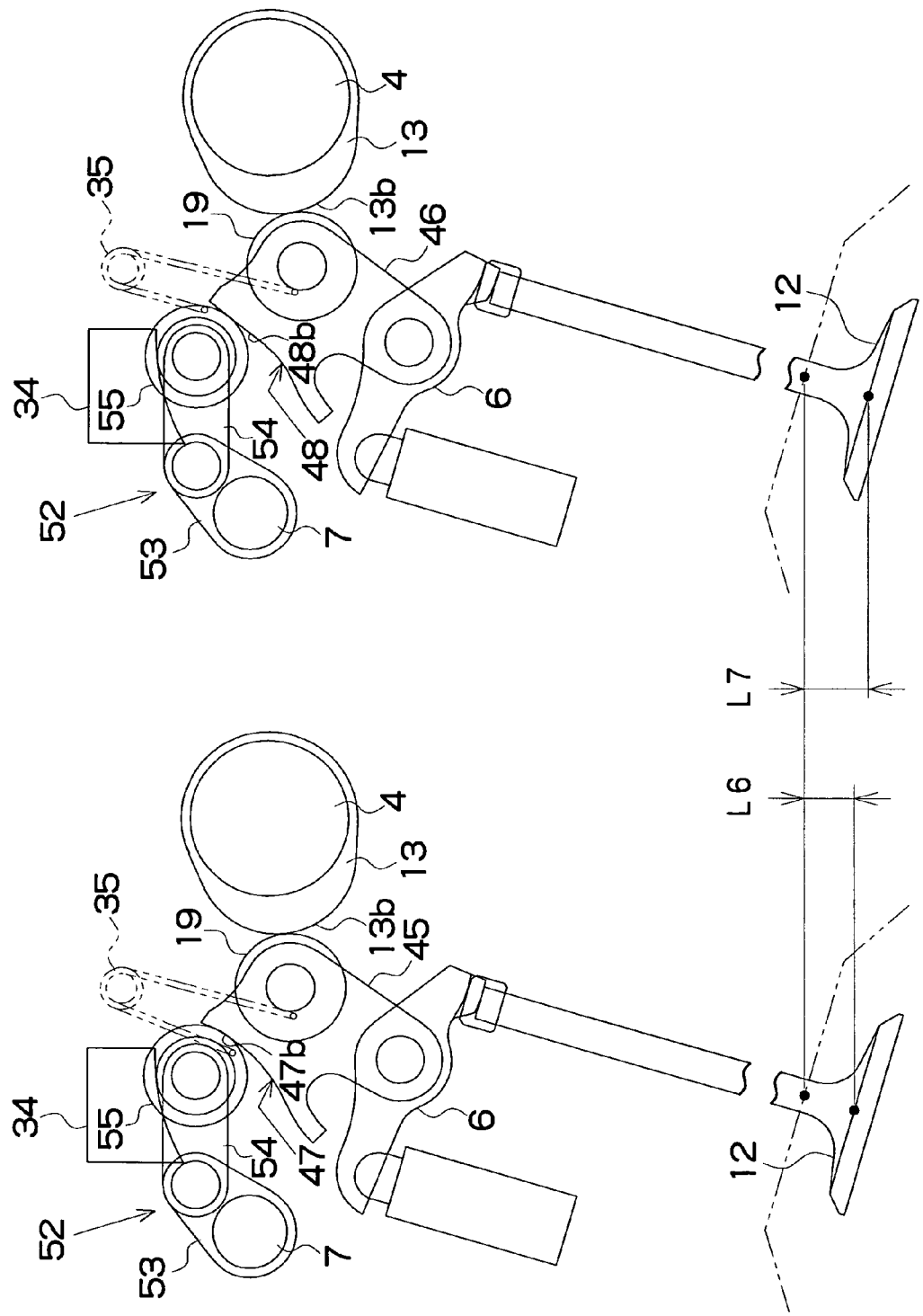
FIGS. 11A and 11B are structural diagrams showing an action produced in the variable valve operating mechanism thereof when the displacements of two swing arms are maximized.

FIGS. 10, 11A, and 11B show a variable valve operating mechanism according to a third example. As shown in FIG. 10, this variable valve operating mechanism 51 differs from those of the first and second examples in the constitution of the variable device 52. In this variable device 52, two arms 53 are fixed to the control shaft 7. A base end of a link 54 is connected to the tip end of each arm 53, while a contact 55 and a ring 56 are supported rotatably by a common shaft 57 on the tip end of the link 54. As shown in FIGS. 11A and 11B, the variable device 52 shifts the contact 55 via the control shaft 7, the arm 53, and the link 54 using an actuator, and varies the contact position between cam surfaces 47, 48 having different profiles and the contacts 55. As a result, a differential displacement is applied to the two swing arms 45, 46, so that maximum lifts of the two valves 12 are dissimilated (L7>L6).

Note that in the variable valve operating mechanism 51 of the third example, the cam surfaces 47, 48 of the two swing arms 45, 46 may be formed with identical profiles, and a differential displacement may be applied to the swing arms 45, 46 by dissimilating the length of the two arms 53 or the two links 54.

EXAMPLE 4

Figure 12:
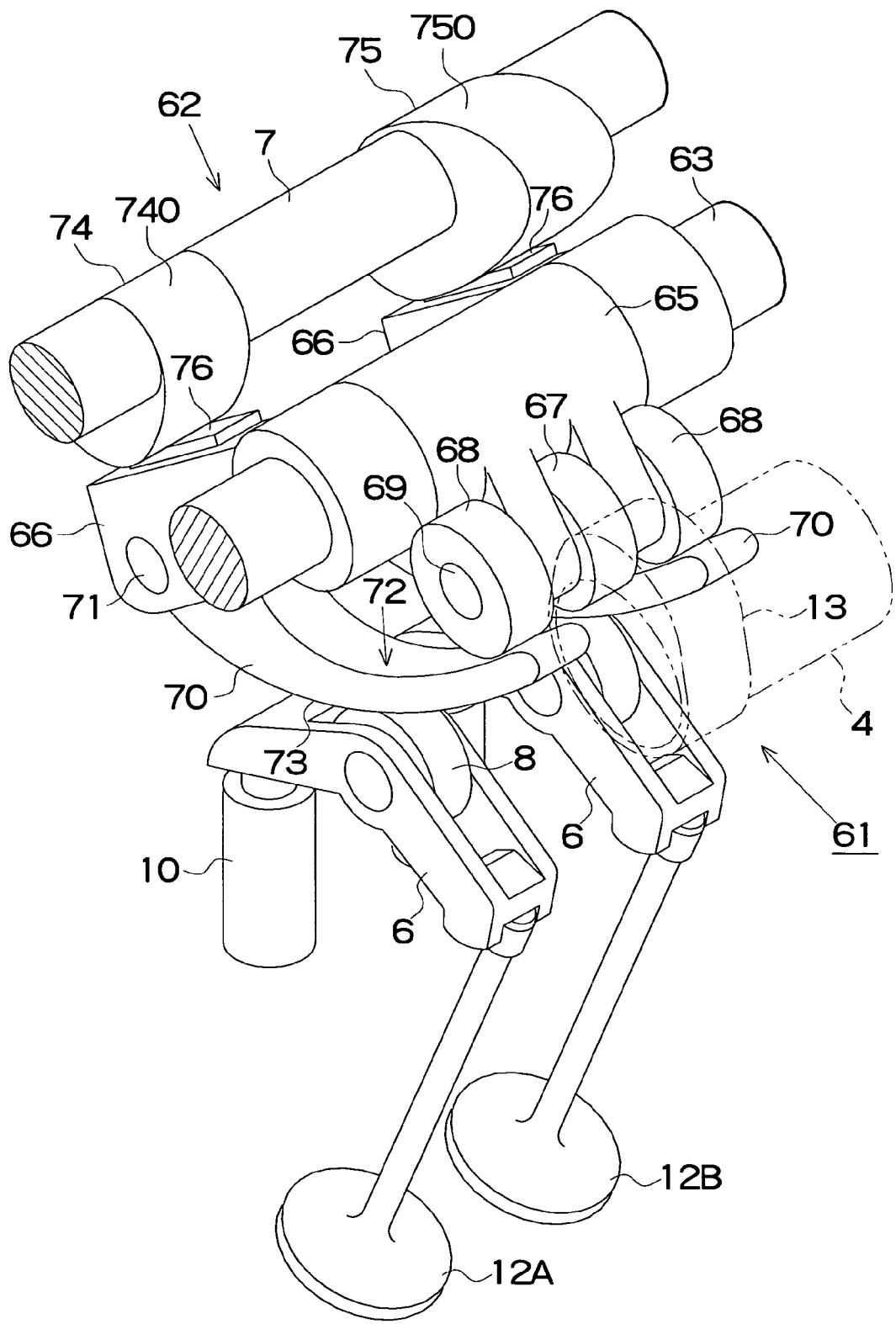
FIG. 12 is a sectional view of a variable valve operating mechanism according to a fourth example of the present invention.
Figure 13:
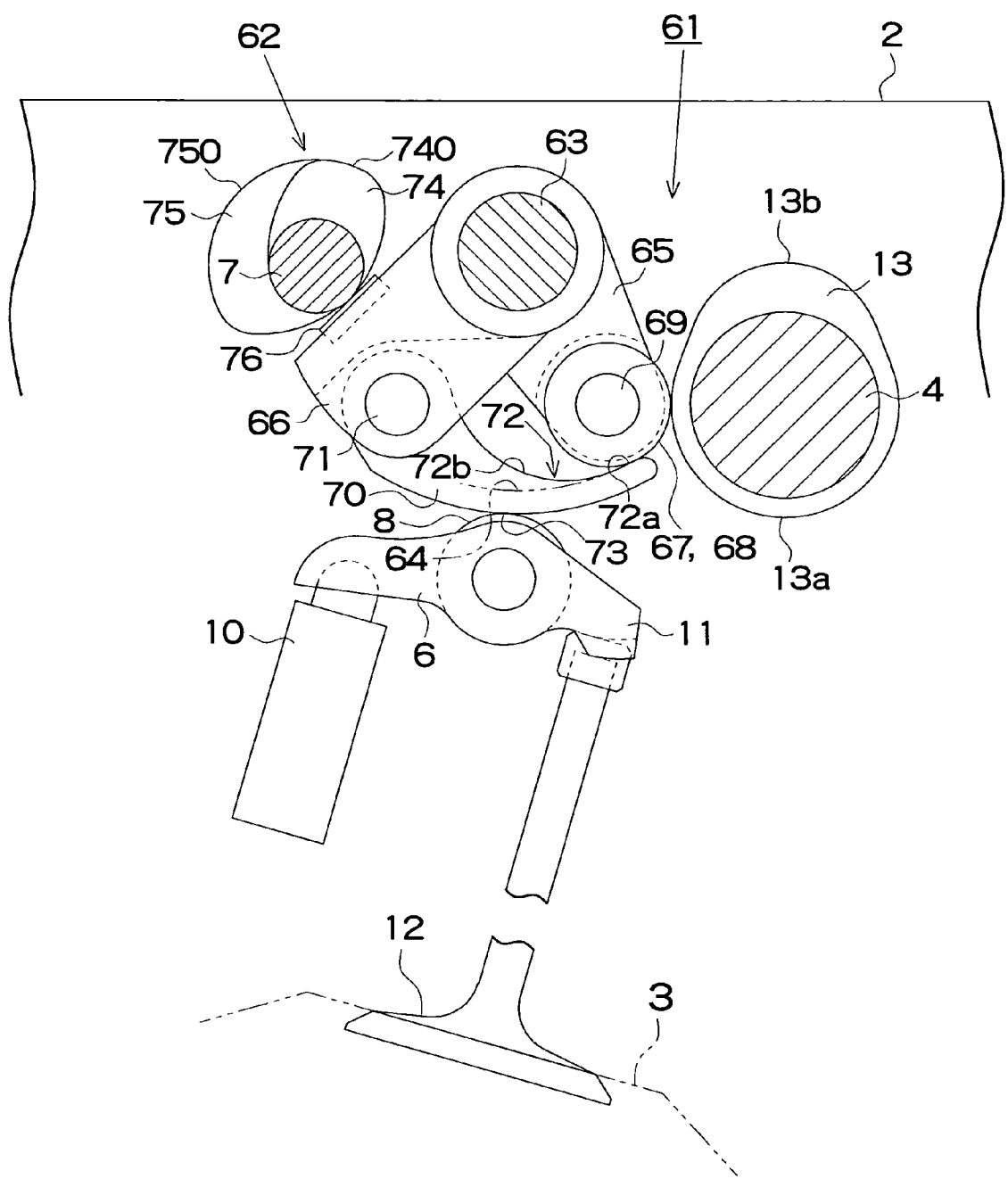
FIG. 13 is a sectional view of the variable valve operating mechanism seen from the left of FIG. 12.

FIGS. 12 to 15 show a variable valve operating mechanism according to a fourth example. As shown in FIGS. 12 and 13, in this variable valve operating mechanism 61, a single drive cam 13 is provided for each cylinder on the cam shaft 4. A support shaft 63 is disposed between the control shaft 7 of a variable device 62 and the camshaft 4. On the support shaft 63, one input arm 65 and a left/right pair of variable arms 66 per cylinder are supported so as to be capable of relative rotation about a common axis. On the tip end of the input arm 65, an input roller 67 which engages with the drive cam 13 and a left/right pair of contacts 68 are supported so as to be capable of rotating about a common shaft 69 or different shafts.

A beak-shaped swing arm 70 is connected to the tip end of the variable arm 66 so as to be capable of swinging up and down about a connecting shaft 71 disposed on the base end thereof. An upward-facing cam surface 72 which engages with the contact 68 and a downward-facing output portion 73 which engages with the roller 8 of the rocker arm 6 are formed on the swing arm 70. The cam surface 72 is provided with a portion 72*a* having a constant radius of curvature centering on the axial center of the support shaft 63, and a lift portion 72*b* which rises toward the support shaft 63 side from the constant-radius-of-curvature portion 72*a*. The output portion 73 is formed concentrically with a cylindrical surface 64 (see FIG. 13) which includes the constant-radius-of-curvature portion 72*a*.

Two variable cams 74, 75 are fixed to the control shaft 7 and are rotated integrally with the control shaft 7 by the actuator 24 (see FIG. 1). The variable cams 74, 75 are formed with cam surfaces 740, 750 having respectively different profiles, and shims 76 which contact the cam surfaces 740, 750 are attached exchangeably to the variable arms 66. As the control shaft 7 rotates, the variable cams 74, 75 drive the swing arms 70 in a left-right direction between the camshaft 4 and control shaft 7 via the variable arm 66, and by varying the initial contact position between the cam surface 72 and the contact 68, the swing angles (displacements) of the two swing arms 70 in the up-down direction are dissimilated.

Figure 14A:
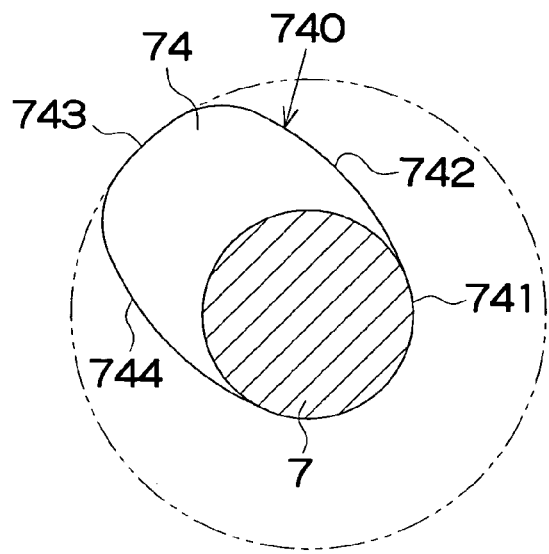
FIGS. 14A, 14B, and 14C are structural diagrams of a variable cam in a variable valve operating mechanism thereof.
Figure 14B:
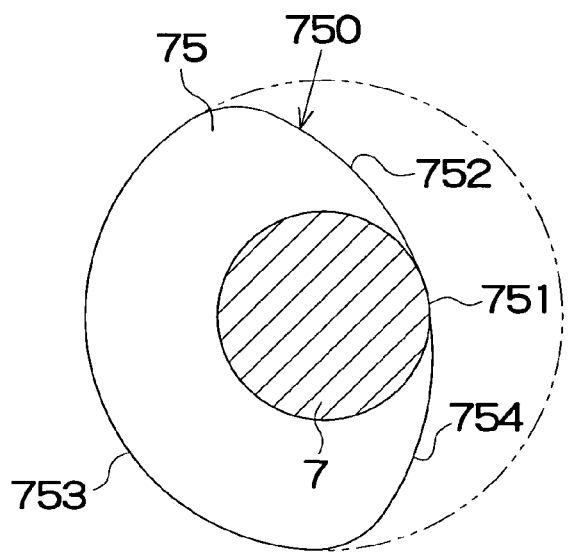
Figure 14C:
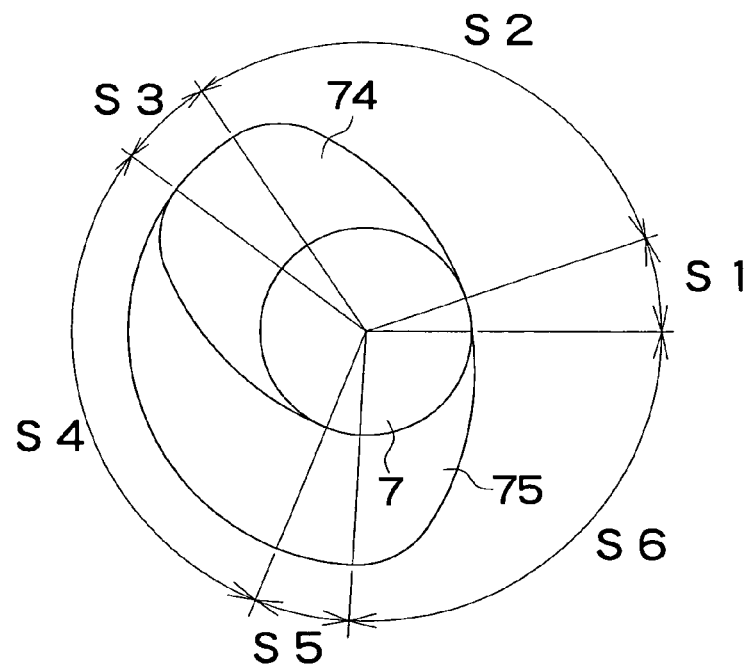

As shown in FIGS. 14A, 14B, and 14C, the cam surfaces 740, 750 respectively include minimum lift portions 741, 751, gradually increasing lift portions 742, 752, maximum lift portions 743, 753, and gradually decreasing lift portions 744, 754. The minimum lift portions 741, 751, gradually increasing lift portions 742, 752, and maximum lift portions 743, 753 are respectively formed at equal heights from the axial center of the control shaft 7 and in identical rotation sections S1, S2, S3 of the control shaft 7. In the sections S4 to S6, the cam surfaces 740, 750 are formed at different heights. The section S4 includes the gradually decreasing lift portion 744 and the maximum lift portion 753. The section S5 includes the minimum lift portion 741 and the maximum lift portion 753. The section S6 includes the minimum lift portion 741 and the decreasing lift portion 754.

Figure 15:
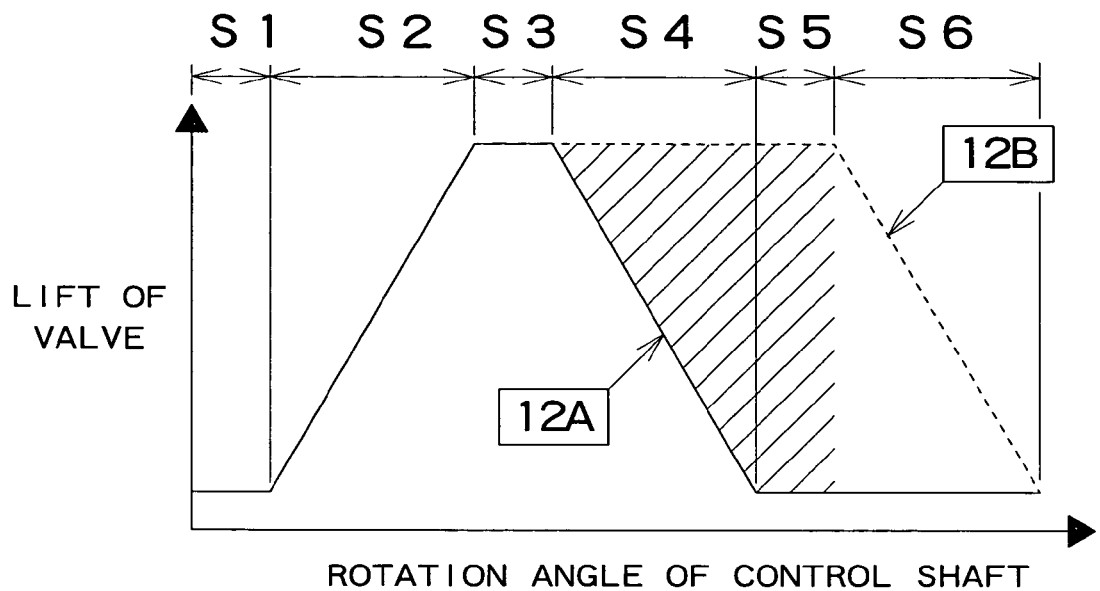
FIG. 15 is a valve characteristic diagram showing an action of the variable valve operating mechanism thereof.

As shown in FIG. 15, the variable device 62 of this example controls the lift of left and right intake valves 12A, 12B (see FIG. 12) in the rotation sections S1 to S6 of the control shaft 7 in the following manner.

<S1: Both Valves Halted>

The minimum lift portions 741, 751 of the left and right variable cams 74, 75 engage with the variable arms 66, and in a full rotation region of the drive cam 13, the contacts 68 contact the constant-radius-of-curvature portions 72*a* of the cam surfaces 72, so that the swing arms 70 and rocker arms 6 are stationary and both the left and right valves 12A, 12B are halted.

<S2: Both Valves Continuously Variable>

The gradually increasing lift portions 742, 752 of the variable cams 74, 75 engage with the variable arms 66, the swing arms 70 are displaced to the camshaft 4 side, the contacts 68 contact the lift portions 72*b* of the cam surfaces 72, and the swing arms 70 and rocker arms 6 swing. Thus, both the left and right valves 12A, 12B open and close by the same lift, and this lift increases continuously in accordance with the profile of the gradually increasing lift portions 742, 752.

<S3: Both Valves at Maximum Lift>

The maximum lift portions 743, 753 of the variable cams 74, 75 engage with the variable arms 66, so that the swing arms 70 reach maximum proximity to the camshaft 4 and the contacts 68 reach a maximum depth of contact with the lift portions 72*b*. Thus, the swing arms 70 and rocker arms 6 swing at the maximum angle, and both the left and right valves 12A, 12B open and close at the maximum lift.

<S4: B Valve at Maximum Lift, a Valve Continuously Variable>

With the right side valve 12B held at the maximum lift, the gradually decreasing lift portion 744 of the left side variable cam 74 engages with the variable arm 66, so that the left side swing arm 70 is displaced to the control shaft side 7. As a result, the lift of the left side valve 12A decreases continuously in accordance with the profile of the gradually decreasing lift portion 744.

<S5: B Valve at Maximum Lift, a Valve Halted>

With the right side valve 12B held at the maximum lift, the minimum lift portion 741 of the left side variable cam 74 engages with the variable arm 66, so that the swing arm 70 and rocker arm 6 are stationary and the left side valve 12A is halted.

<S6: A Valve Halted, B Valve Continuously Variable>

With the left side valve 12A halted, the gradually decreasing lift portion 754 of the right side variable cam 75 engages with the variable arm 66, so that the right side swing arm 70 is displaced to the control shaft 7 side and the lift of the right side valve 12B decreases continuously in accordance with the profile of the gradually decreasing lift portion 754.

According to the variable valve operating mechanism 61 of this example, the following effects are obtained.

(a) The swing arm 70 is provided on a different axis to the camshaft 4, so that a power transmission path from the drive cam 13 to the rocker arm 6 is open. Thus, the load acting on the control shaft 7 from the camshaft 4 side can be reduced, and the actuator 24 can be reduced in size.

(b) The two variable cams 74, 75 on the control shaft 7 are provided with cam surfaces 740, 750 having different profiles, and therefore the mechanism for generating a swirl can be structured simply.

(c) As shown by the hatching in FIG. 15, by providing the profiles of the variable cams 54, 55 in various combinations, a swirl can be generated at an optimum timing in a comparatively large rotation section of the control shaft 7, and as a result, a further improvement in fuel consumption can be achieved.

(d) The maximum lift portions 743, 753 of the cam surfaces 540, 550 are formed at the same height in an identical rotation section S3 of the control shaft 7, and therefore, when the two valves 12A, 12B are driven at the maximum lift, the force that acts on the variable cams 54, 55 from the drive cam 13 can be made uniform, so that the rotary torque that acts on the control shaft 7 can be reduced to zero.

(e) Hence, even when a small actuator 21 is used, the control shaft 7 can be held securely in a maximum power generating position, and as a result, irregularities in the lift and working angle of the two valves can be prevented, and vibration in the gasoline engine can be suppressed.

EXAMPLE 5

FIGS. 16A, 16B, 16C, and 17 show a variable valve operating mechanism according to a fifth example. This variable valve operating mechanism is identical to the first example in the structure of the variable device 23 (see FIGS. 1 to 3), but differs from the first example in the shape of the variable cams 81, 82. The variable cams 81, 82 are provided in different left/right positions on the control shaft 7 (see FIG. 1), and include cam surfaces 810, 820 having respectively different profiles.

Figure 16A:
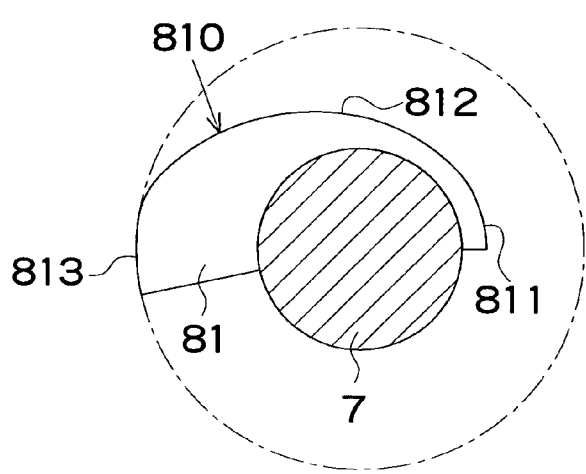
FIGS. 16A, 16B, and 16C are structural diagrams of a cam in a variable valve operating mechanism according to a fifth example of the present invention.
Figure 16B:
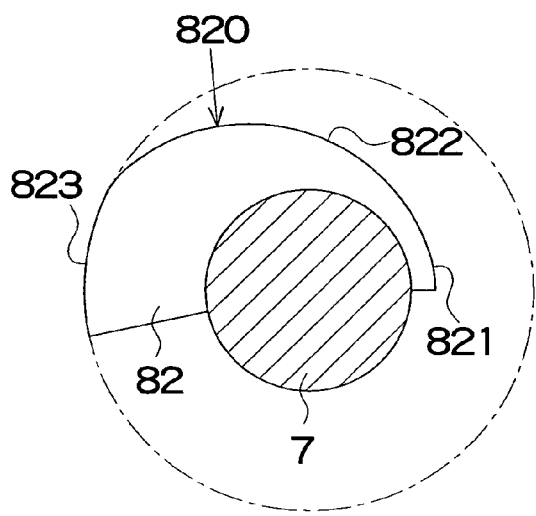
Figure 16C:
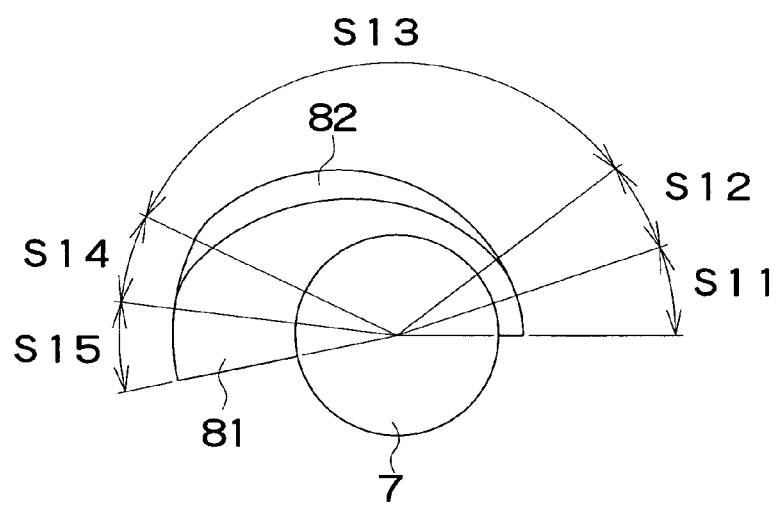

As shown in FIGS. 16A, 16B, and 16C, the cam surfaces 810, 820 respectively include minimum lift portions 811, 821, variable lift portions 812, 822, and maximum lift portions 813, 823. The minimum lift portions 811, 821 and maximum lift portions 813, 823 are respectively formed at equal heights from the axial center of the control shaft 7 and in identical rotation sections S11, S15 of the control shaft 7.

In sections S12, S13, S14, the cam surfaces 810, 820 are formed at respectively different heights. The section S12 includes a rear half portion of the minimum lift portion 811 and a starting end portion of the variable lift portion 822. The section S13 includes an intermediate portion of the variable lift portion 812 and an intermediate portion of the variable lift portion 822. The section S14 includes a terminal end portion of the variable lift portion 812 and a front half portion of the maximum lift portion 823.

Figure 17:
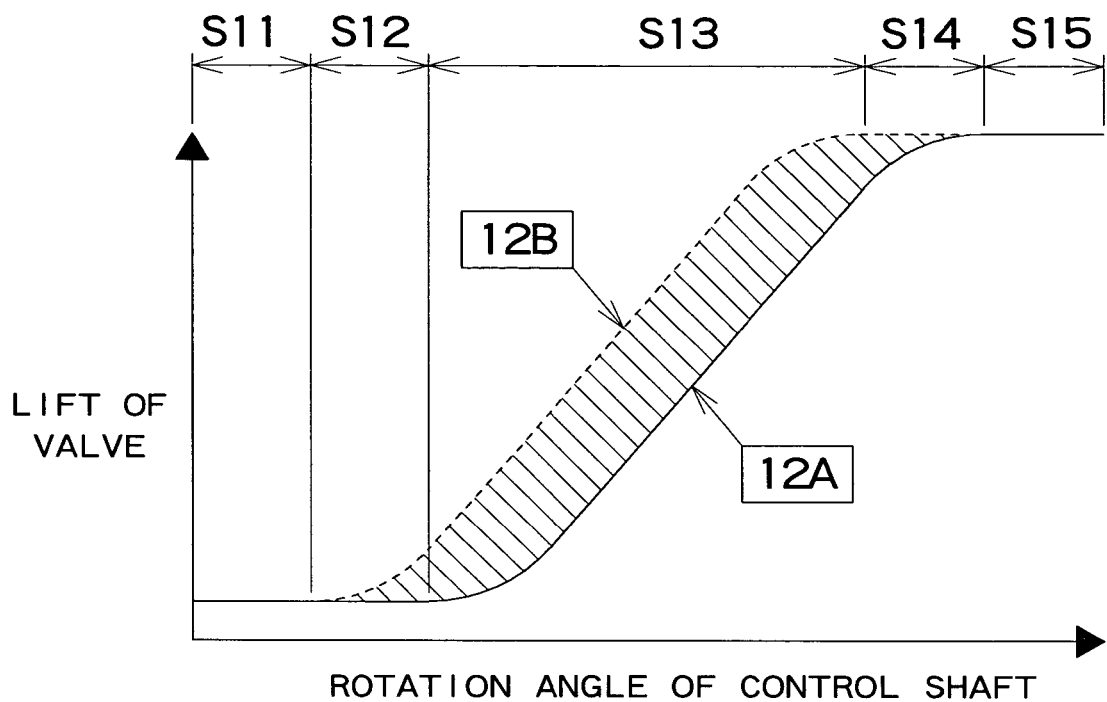
FIG. 17 is a valve characteristic diagram showing an action of the variable valve operating mechanism.
Figure 18:
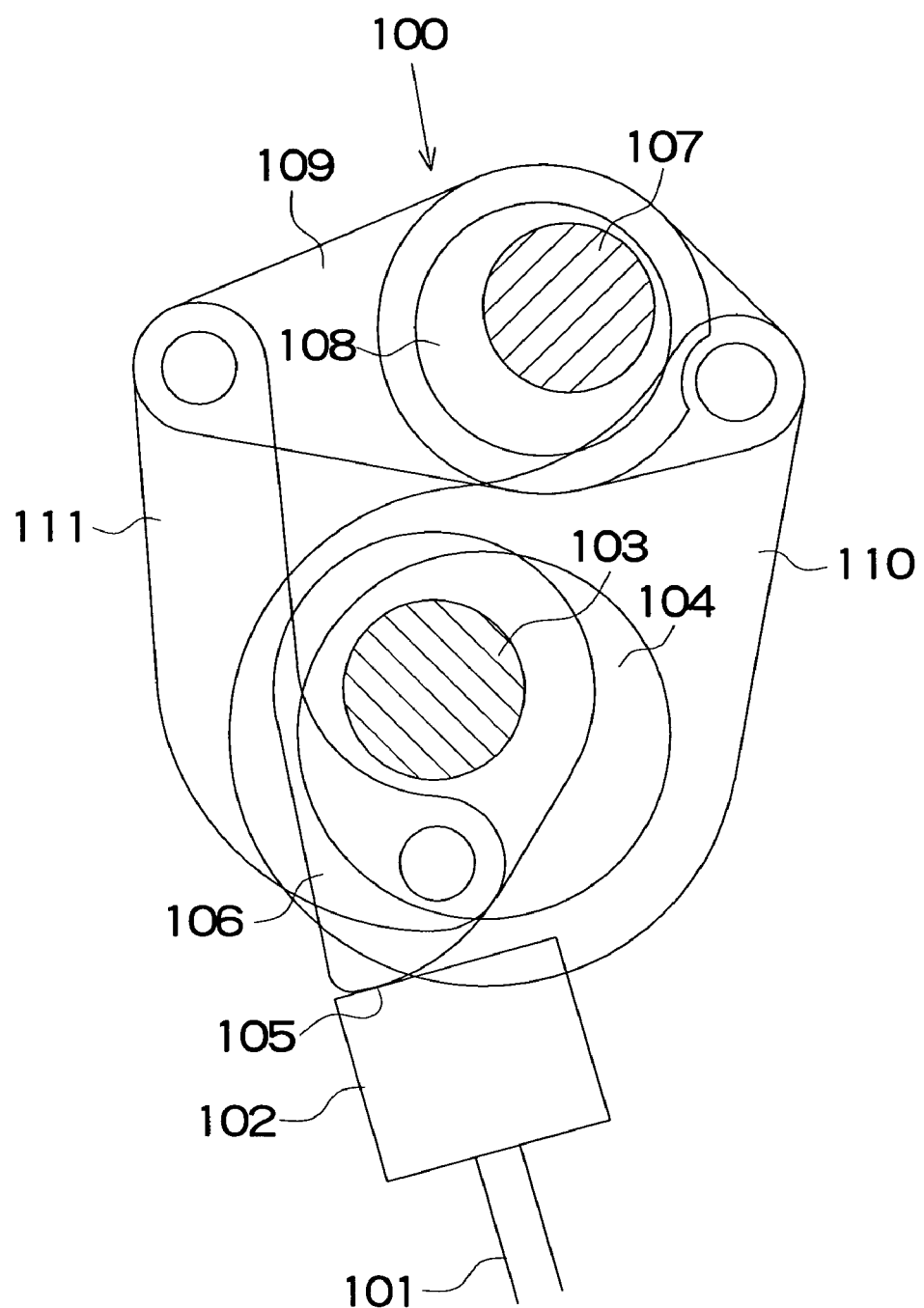
FIG. 18 is a sectional view showing a conventional variable valve operating mechanism.

As shown in FIG. 17, the variable device 23 of this example controls the lift of the two intake valves 12A, 12B within the rotation sections S11 to S15 of the control shaft 7 in the following manner. Note that an operation of the variable device 23 when the control shaft 7 rotates in a single direction (the clockwise direction of FIG. 16) is described below, but when the control shaft 7 rotates in reverse, the variable device 23 operates according to a reverse sequence.

<S11: Both Valves Halted>

The minimum lift portions 811, 821 of the two variable cams 81, 82 engage with the variable arms 27, 28 (see FIG. 1), and in a full rotation region of the drive cam 13, the contacts 30 contact the constant-radius-of-curvature portions 17a of the cam surfaces 17, so that the swing arms 5 and rocker arms 6 are stationary and both the left and right valves 12A, 12B are halted.

<S12: A Valve Halted, B Valve Continuously Variable>

With one valve 12A halted, the variable lift portion 822 of the variable cam 82 engages with the variable arm 28, so that the contact 30 contacts the lift portion 72b of the cam surface 17 to a shallow extent, and the swing arm 5 and rocker arm 6 swing slightly. As a result, the lift of the other valve 12B begins to increase in accordance with the profile of the variable lift portion 822.

<S13: Both Valves Continuously Variable>

The variable lift portions 812, 822 of the variable cams 81, 82 engage with the variable arms 27, 28, the contacts 30 rise along the lift portions 72b of the cam surfaces 17, and the swing arms 5 and rocker arms 6 swing. Thus, the lift of the two valves 12A, 12B increases continuously in accordance with the profiles of the variable lift portions 812, 822.

<S14: A Valve Continuously Variable, B Valve at Maximum Lift>

With one valve 12A in a state of continuously varying lift, the maximum lift portion 823 of the variable cam 82 engages with the variable arm 28, the contact 30 rises to the top of the lift portion 72b, the swing arm 5 and rocker arm 6 are displaced by the maximum angle, and the other valve 12B opens and closes by the maximum lift.

<S15: Both Valves at Maximum Lift>

The maximum lift portions 813, 823 of the variable cams 81, 82 engage with the variable arms 27, 28, the contacts 30 rise to the top of the lift portions 72b, the swing arms 5 and rocker arms 6 are displaced by the maximum angle, and both valves 12A, 12B open and close by the maximum lift.

Hence, according to this example, the two variable cams 81, 82 are provided with cam surfaces 810, 820 having different profiles, and therefore, similarly to the fourth example, a swirl (the hatched part of FIG. 17) can be generated efficiently and through a simple mechanism. In particular, the maximum lift portions 813, 823 of the cam surfaces 810, 820 are formed at identical heights in the same rotation section S15 of the control shaft 7, and therefore rotary torque acting on the control shaft 7 at maximum lift can be reduced to zero, and the control shaft 7 can be held securely in the maximum power generating position using a small actuator 21. Other actions and effects are identical to those of the first example.

The present invention is not limited to the above embodiments, and various modifications may be properly made without departing from the subject matter of the present invention.

What is claimed is:

1. A variable valve operating mechanism comprising:
   two valve operating members for opening and closing two valves individually;
   a drive cam provided on a single camshaft;
   two swing arms for transmitting a power of the drive cam to the valve operating members individually by swinging about a different axis to the camshaft; and
   a variable device for modifying a displacement of the swing arm per rotation of the drive cam in accordance with an operating condition of the internal combustion engine, the variable device comprising:
   a single control shaft;
   an actuator for driving the control shaft; and
   a cam device that operates in conjunction with the control shaft to dissimilate the displacement of the two swing arms, wherein the cam device comprises two variable cams for driving the two swing arms individually, and the two variable cams are provided on the control shaft and are provided with cam surfaces having respectively different profiles, wherein, in a first rotation section of the control shaft, each of the cam surfaces of the two variable cams comprises the maximum lift portion at which the respective valves reach a maximum lift, and wherein in a second rotation section of the control shaft, which is adjacent to the first rotation section, the cam surface of one of the variable cams comprises continuous maximum lift portions for maintaining the maximum lift of the valve, and the cam surface of the other variable cam comprises a gradually decreasing lift portion for continuously decreasing the lift of the valve.

2. The variable valve operating mechanism according to claim 1, wherein each cam surface of the two variable cams includes a maximum lift portion in an identical rotation section of the control shaft, and the both maximum lift portions are formed at equal heights from an axial center of the control shaft.

3. The variable valve operating mechanism according to claim 2, wherein the cam surfaces of the two variable cams are formed at different heights from the axial center of the control shaft in a different rotation section of the control shaft to the rotation section of the maximum lift portions.

4. The variable valve operating mechanism according to claim 1, wherein, in a third rotation section of the control shaft, which is adjacent to the second rotation section, the cam surface of one of the variable cams comprises continuous maximum lift portions for maintaining the maximum lift of the valve, and the cam surface of the other variable cam comprises a minimum lift portion for halting the valve.

5. The variable valve operating mechanism according to claim 4, wherein, in a fourth rotation section of the control shaft, which is adjacent to the third rotation section, the cam surface of one of the variable cams comprises a gradually decreasing lift portion for continuously decreasing the lift of the valve, and the cam surface of the other variable cam comprises continuous minimum lift portions for halting the valve.

6. The variable valve operating mechanism according to claim 1, wherein the variable device further comprises:
   a support shaft disposed between the control shaft and the camshaft;
   two variable arms connected to the support shaft; and
   a connecting shaft connecting the swing arms to the variable arms.

7. The variable valve operating mechanism according to claim 1, wherein the variable device further comprises a guide member disposed on a housing of the variable valve operating mechanism in a position above a cam surface of the swing arm, and a downward-facing guide surface which opposes the cam surface is formed on the guide member.

8. The variable valve operating mechanism according to claim 1, wherein the two swing arms further comprise:
   an input portion, which engages with the drive cam;
   an output portion which engages with one of the valve operating members; and
   a cam surface which contacts a contact of the variable device.

9. The variable valve operating mechanism according to claim 8, wherein the swing arm is disposed above a cylinder head, the output portion is disposed so as to face downward, and the cam surface is disposed so as to face upward.

10. The variable valve operating mechanism according to claim 1, wherein the valve operating members comprise rocker arms which rotate about a base end.

* * * * *